United States Patent
Bhardwaj et al.

(10) Patent No.: US 10,956,808 B1
(45) Date of Patent: Mar. 23, 2021

(54) SYSTEM AND METHOD FOR UNSUPERVISED ANOMALY DETECTION

(71) Applicant: Fractal Analytics Private Limited, Mumbai (IN)

(72) Inventors: Shivam Bhardwaj, Jaipur (IN); Nitish Pant, Dehradun (IN); Nikhil Fernandes, Mumbai (IN); Soudip Roy Chowdhury, Kolkata (IN)

(73) Assignee: Fractal Analytics Private Limited, Mumbai (IN)

( * ) Notice: Subject to any disclaimer, the term of this patent is extended or adjusted under 35 U.S.C. 154(b) by 0 days.

(21) Appl. No.: 16/816,352

(22) Filed: Mar. 12, 2020

(51) Int. Cl.
*G06N 3/04* (2006.01)
*G06F 16/2455* (2019.01)
*G06N 3/08* (2006.01)

(52) U.S. Cl.
CPC ..... *G06N 3/0454* (2013.01); *G06F 16/24568* (2019.01); *G06N 3/0445* (2013.01); *G06N 3/088* (2013.01)

(58) Field of Classification Search
None
See application file for complete search history.

(56) References Cited

U.S. PATENT DOCUMENTS

2019/0121350 A1* 4/2019 Cella .................. H03M 13/353

OTHER PUBLICATIONS

Jiang et al, "A GAN-Based Anomaly Detection Approach for Imbalanced Industrial Time Series", 2019, IEEE Access, all pages (Year: 2019).*

Wang et al, "Ensembles of Generative Adversarial Networks", 2016, arXiv, all pages (Year: 2016).*

Goh, Johnathan, et. al., Anomaly detection in cyber physical systems using recurrent neural networks, in 2017 IEEE 18th International Symposium on High Assurance Systems Engineering (HASE), IEEE, 140-145, 2017.

Gupta, Manish, Outlier detection for temporal data: A survey, IEEE Transactions on Knowledge and Data Engineering 26, 9, 2250-2267, 2013.

Lazarevic, Aleksandar, et. al., Feature bagging for outlier detection, in Proceedings of the eleventh ACM SIGKDD International conference on Knowledge discovery in data mining. ACM, 157-166, 2005.

Ahmed, Mohiuddin, et. al., A survey of network anomaly detection techniques, Journal of Network and Computer Applications, 2016.

Huang, Ling, et. al., In-network PCA and anomaly detection, in Advances in Neural Information Processing Systems, 2007.

Ringberg, Haakon, et. al., Sensitivity of PCA for traffic anomaly detection, in ACM SIGMETRICS Performance Evaluation Review, vol. 35. ACM, 109-120, 2017.

He, Zengyou, et. al., Discovering cluster-based local outliers, Pattern Recognition Letters 24, 9-10, 1641-1650, 2003.

Prerau, Michael J and Eskin, Eleazar, Unsupervised anomaly detection using an optimized K-nearest neighbors algorithm, undergraduate Thesis, Columbia University, 2000.

Kriegel, Hans-Peter, et. al., Angle-based outlier detection in high-dimensional data, in Proceedings of the 14th ACM SIGKDD international conference on Knowledge discovery and data mining. ACM, 444-452, 2008.

(Continued)

*Primary Examiner* — Daniel C Puentes
(74) *Attorney, Agent, or Firm* — Wiley Rein LLP

(57) ABSTRACT

Some embodiments are associated with a system and method for deep learning unsupervised anomaly detection in Internet of Things (IoT) sensor networks or manufacturing execution systems. The system and method use an ensemble of a plurality of generative adversarial networks for anomaly detection.

10 Claims, 3 Drawing Sheets

(56) References Cited

OTHER PUBLICATIONS

Song, Yale, et. al., One-class conditional random fields for sequential anomaly detection, in Twenty-Third International Joint Conference on Artificial Intelligence, 2013.

Doersch, Carl, Tutorial on variational autoencoders, arXiv preprint arXiv:1606.05908, 2016.

Huang, Hao and Kasiviswanathan, Shiva Prasad, Streaming anomaly detec-tion using randomized matrix sketching, Proceedings of the VLDB Endowment 9, 3 (2015), 192-203, 2015.

Baker, Christopher G, et. al., Low-rank incremental methods for computing dominant singular subspaces, Linear Algebra Appl. 436, 8, 2866-2888.

Kasiviswanathan, Shiva P, et. al., Online l1-dictionary learning with application to novel document detection, in Advances in Neural Information Processing Systems. 2258-2266, 2012.

Greff, Klaus, et. al., LSTM: A search space odyssey, IEEE transactions on neural networks and learning systems 28, 10, 2222-2232, 2016.

Chung, Junyoung, et. al., Empirical evaluation of gated recurrent neural networks on sequence modeling, arXiv preprint arXiv:1412.3555, 2014.

Mogren, Olof, C-RNN-GAN: Continuous recurrent neural networks with adversarial training, arXiv preprint arXiv:1611.09904, 2016.

Esteban, Cristóbal, et. al., Real-valued (medical) time series generation with recurrent conditional gans, arXiv preprint arXiv:1706.02633, 2017.

Li, Dan, et. al., Anomaly detection with generative adversarial networks for multivariate time series, arXiv preprint arXiv:1809.04758, 2018.

Li, Dan, et. al., MAD-GAN: Multivariate anomaly detection for time series data with generative adversarial networks, in International Conference on Artificial Neural Networks. Springer, 703-716, 2019.

Goodfellow, Ian, et. al., Generative adversarial nets, in Advances in neural information processing systems. 2672-2680, 2014.

Li, Yang, et. al., Network anomaly detection based on TCM-KNN algorithm, in Proceedings of the 2nd ACM symposium on Information, computer and communications security, ACM, 13-19, 2007.

\* cited by examiner

SYSTEM AND METHOD FOR UNSUPERVISED ANOMALY DETECTION

RELATED APPLICATIONS

This application claims priority benefit of Indian Patent Application No. 202021003602, filed Jan. 27, 2020, which are incorporated entirely by reference herein for all purposes.

FIELD

The invention relates to systems and methods in the field of computer science, and in particular to the deep learning unsupervised anomaly detection in Internet of Things sensor networks.

BACKGROUND ART

Advancements in the field of sensor technology and communication networks have led to the development of Internet of Things (IoT) sensor networks. See Marjani Monsen, et. Al., Big IoT data analytics: architecture, opportunities, and open research challenges, IEEE Access 5, 2017. The IoT sensor networks consist of the systems of interconnected computing devices, mechanical and digital machines which are provided with unique identifiers (UIDs) and the ability to transfer data over a network without/with minimum human-human or human-machine interactions. This makes it very easy for an engineer located at a remote location to monitor these complex processes and to take preventive actions if, such a need arises. One of the most important tasks in such situations is the detection of anomalies. See Chandola, Varun, et. Al., *Comparative evaluation of anomaly detection techniques for sequence data*, In 2008 Eighth IEEE international conference on data mining, IEEE, 743-748, 2008; Goh, Johnathan, et. al., *Anomaly detection in cyber physical systems using recurrent neural networks*, In 2017 IEEE 18th International Symposium on High Assurance Systems Engineering (HASE), IEEE, 140-145, 2017.

Anomalies are the data instances whose statistical behavior is very different from the data generated during a normal mode of operation. An example of anomaly can be an instance taking values that are either very high or very low compared to the values generated by time-series during the normal mode of operation. See Gupta, Manish, *Outlier detection for temporal data: A survey*, IEEE Transactions on Knowledge and Data Engineering 26, 9, 2250-2267, 2013. In summary, given an instance of a multivariate time series data, anomaly detection algorithm should be able to classify it as an anomalous or non-anomalous data. Anomalies can occur in the data because of a variety of reasons. For example in credit card fraud detection system anomalies can occur in the data because of malicious online activity, cyber-attacks, terrorist activity, and a system/sub-systems failure. Since the occurrence of an anomaly is an example of a rare event so, it becomes hard and most of the time impossible for an AI engineer to obtain examples of labeled anomalous data.

Since one can understand anomalies as the example of data that is statistically different from the data during the normal mode of operation, a straight forward approach to detect them is to define a region in the feature space that conforms to the part of data set showing normal or expected behavior. An instance of the data that lies outside this normal region is termed as anomaly. See Lazarevic, Aleksandar, et. al., *Feature bagging for outlier detection*, In Proceedings of the eleventh ACM SIGKDD international conference on Knowledge discovery in data mining. ACM, 157-166, 2005; Li, Yang, et. al., *Network anomaly detection based on TCM-KNN algorithm*, In Proceedings of the 2nd ACM symposium on Information, computer and communications security, ACM, 13-19, 2007.

Several factors make the task of detecting anomalies difficult as compared to the other binary classification problems. First, defining a region in feature space which encompasses all the possible normal behavior is a very difficult task in itself. Also, even if one can define such a region in feature space the boundary of this region is not very precise. As a result, a data instance lying outside this region but very close to it will be declared as an anomaly by the algorithm even if the data instance is normal. In many real-time operations, the current notion of the normal behavior of data keeps evolving so, what seems to be normal behavior of data at present might not remain the same as the time passes by. Often, the observations coming from the sensing devices that are the part IoT network contains a lot of noise which can be misunderstood as an anomaly by the anomaly detection system. So, there is also an obvious challenge that comes as a result of noise in the data. These reasons along with several other factors render the task of anomaly detection a challenging problem.

In most of the practical situations occurrence of anomaly is a rare event so obtaining the labels for the anomalous data instance is not possible. Therefore, unsupervised learning algorithms are most suited for the task of anomaly detection. See Ahmed, Mohiuddin, et. al., *A survey of network anomaly detection techniques*, Journal of Network and Computer Applications, 2016; Chandola, Varun, et. al., Anomaly detection: A survey, ACM computing surveys (CSUR), 2009. These unsupervised algorithms can be broadly classified into four main categories including: linear-model based approaches; distance or clustering-based approaches; density estimation based approaches; and deep-learning based approaches. See Huang, Ling, et. al., *In-network PCA and anomaly detection*, In Advances in Neural Information Processing Systems, 2007; Ringberg, Haakon, et. al., *Sensitivity of PCA for traffic anomaly detection*, In ACM SIGMETRICS Performance Evaluation Review, Vol. 35. ACM, 109-120, 2017; Wold, Svante, et. al., *Principal component analysis*, Chemometrics and intelligent laboratory systems 2, 1-3, 37-52, 1987; Dudani, Sahibsingh, *The distance-weighted k-nearest-neighbor rule*, IEEE Transactions on Systems, Man, and Cybernetics 4, 325-327, 1976; He, Zengyou, et. al., *Discovering cluster-based local outliers*, Pattern Recognition Letters 24, 9-10, 1641-1650, 2003; Prerau, Michael J and Eskin, Eleazar, *Unsupervised anomaly detection using an optimized K-nearest neighbors algorithm*, undergraduate Thesis, Columbia University, 2000; Kriegel, Hans-Peter, et. al., *Angle-based outlier detection in high-dimensional data*, In Proceedings of the 14th ACM SIGKDD international conference on Knowledge discovery and data mining. ACM, 444-452, 2008; Lazarevic, Aleksandar and Kumar, Vipin, *Feature bagging for outlier detection*, In Proceedings of the eleventh ACM SIGKDD international conference on Knowledge discovery in data mining. ACM, 157-166, 2005; Song, Yale, et. al., *One-class conditional random fields for sequential anomaly detection*, In Twenty-Third International Joint Conference on Artificial Intelligence, 2013; Doersch, Carl, *Tutorial on variational autoencoders*, arXiv preprint arXiv:1606.05908, 2016.

Algorithms based on linear-models for anomaly detection rely on projecting the higher-dimensional time-series data to a lower-dimensional subspace. This lower-dimensional subspace is spanned by the principal components of the data obtained as a result of singular value decomposition. See Loan, Charles F Van and Golub, Gene H, *Matrix computations*, Johns Hopkins University Press, 1983. Choosing the dimensionality of the lower dimensional sub-space depends upon the amount of variance in the original data that is captured by decomposing the time-series on to the lower-dimensional subspace See Wold, Svante, et. al., *Principal component analysis*, Chemometrics and intelligent laboratory systems 2, 1-3, 37-52, 1987. The choice of the dimensionality of the projected time series greatly affects the false positive detection rate of the anomaly detection process and hence effects the performance KPIs like precision and recall. See Ringberg, Haakon, et. al, *Sensitivity of PCA for traffic anomaly detection*, In ACM SIGMETRICS Performance Evaluation Review, Vol. 35. ACM, 109-120, 2007. Principal component analysis (PCA), inherently being a linear-transformation, has shown to perform badly in the presence of trends or non-stationarity in the data. The performance of detecting anomalies also reduces greatly when the data is de-rived from a distribution that deviates from multivariate Gaussian distribution. In real-time anomaly detection, PCA based approach is modified slightly by maintaining, at every time t, a low-rank matrix with orthogonal columns that can linearly reconstruct the entire prior (till time t−1) non-anomalous data points. See Huang, Hao and Kasiviswanathan, Shiva Prasad, *Streaming anomaly detec-tion using randomized matrix sketching*, Proceedings of the VLDB Endowment 9, 3 (2015), 192-203, 2015. The anomalous data instances are located very far from their lower-dimensional approximation compared to the normal data instances in the sense of $L^p$-norm. This approach to applying PCA in the real-time setting is called as incremental PCA. See Baker, Christopher G, et. al., *Low-rank incremental methods for computing dominant singular subspaces*, Linear Algebra Appl. 436, 8, 2866-2888; 2012; Kasiviswanathan, Shiva P, et. al., *Online l1-dictionary learning with application to novel document detection*, In Advances in Neural Information Processing Systems. 2258-2266, 2012. These approaches, like their batch-processing counterparts, suffer a lot, performance-wise, in the presence of trend and non-stationary patterns present in the data. In summary, anomaly detection approaches based on linear-models perform badly in the presence of trend and seasonal non-stationarity in the data and also when the data generating distribution deviates from multivariate Gaussian.

The most popular method for detecting anomalies using distance-based approaches is K-nearest neighbors (KNN). See Dudani, Sahibsingh A., *The distance-weighted k-nearest-neighbor rule*, IEEE Transactions on Systems, Man, and Cybernetics 4, 325-327, 1976. The KNN based anomaly detection algorithms check whether a given data instance is located in the sparse regions of the feature space. This decision is taken based on the calculation of the distance of data instance from its K-nearest neighbors. If this distance crosses a certain threshold, then the data instance is labeled as an anomaly. See Li, Yang, et. al., *Network anomaly detection based on TCM-KNN algorithm*, In Proceedings of the 2nd ACM symposium on Information, computer and communications security. ACM, 13-19. 2007; Prerau, Michael J and Eskin, Eleazar, *Unsupervised anomaly detection using an optimized K-nearest neighbors algorithm*, undergraduate Thesis, Columbia University, 2000. Clustering algorithms form an important sub-category of distance-based anomaly detection algorithms. An example of the clustering-based anomaly detection algorithm is, CBLOF (clustering-based local outlier factor) which was introduced as an improvement over LOF. See Breunig, Markus M, et. al., *LOF: identifying density-based local outliers*, In ACM sigmod record, Vol. 29. ACM, 93-104, 2000; He, Zengyou, et. al., *Discovering cluster-based local outliers*, Pattern Recognition Letters 24, 9-10, 1641-1650, 2003. This algorithm uses a predefined anomaly score function to identify anomalies based on clustering. The distance-based approaches for anomaly detection work better if one has prior knowledge about the duration and the number of anomalies in the data.

Distance-based anomaly detection approaches do not take into account the nature of data generating distribution. As a result, distance-based approaches do not utilize the correlations between different attributes of the data. Density-estimation based approaches to anomaly detection were introduced to overcome this shortcoming of the distance-based approaches. Angle-based outlier detection (ABOD), one-class conditional random fields and feature bagging (FB) methods are few examples of important density-estimation based approaches for anomaly detection. See Kriegel, Hans-Peter, et. al., *Angle-based outlier detection in high-dimensional data*, In Proceedings of the 14th ACM SIGKDD international conference on Knowledge discovery and data mining. ACM, 444-452, 2008; Song, Yale, et. al., *One-class conditional random fields for sequential anomaly detection*, In Twenty-Third International Joint Conference on Artificial Intelligence, 2013; Lazarevic, Aleksandar and Kumar, Vipin, *Feature bagging for outlier detection*, In Proceedings of the eleventh ACM SIGKDD international conference on Knowledge discovery in data mining. ACM, 157-166, 2005. Since these methods do not take into account the temporal correlations in the data, so these methods are not suitable for detecting anomalies in the time-series data.

Unsupervised approaches for anomaly detection in sequential data has gained a lot of popularity since the advent of LSTM (long-short term memory) and GRU (gated recurrent unit) networks. See Greff, Klaus, et. al., *LSTM: A search space odyssey*, IEEE transactions on neural networks and learning systems 28, 10, 2222-2232, 2016; Chung, Junyoung, et. al., *Empirical evaluation of gated recurrent neural networks on sequence modeling*, arXiv preprint arXiv:1412.3555, 2014. Auto-encoders (AE) and variational auto-encoders (VAE) designed using LSTM networks are popularly used for unsupervised anomaly detection. In AE and VAE deviation of a data instance from the normal behavior is captured by the reconstruction error. If this reconstruction error exceeds a certain threshold, then the data instance is termed as an anomaly.

Models based on auto-encoder architecture requires one to train these models on normal data instances and hence present operational constraints. Since in most of the practical situations the anomalous instances are very rare (5-15% of the total data-set), hence generative models with adversarial training become an obvious choice for the anomaly detection task. Although generative adversarial networks (GANs) have proven to be very successful in generating high-quality images using a lower-dimensional noise input, their use in generating good quality sequential data is still very limited. See Goodfellow, Ian, et. al., *Generative adversarial nets*, In Advances in neural information processing systems. 2672-2680, 2014. In the past, GANs have been used to produce polyphonic music with recurrent neural networks as generator (G) and discriminator (D), or to generate real-valued medical time series using a conditional version of recurrent GAN. See Mogren, Olof, C-RNN-GAN: *Continuous recurrent neural networks with adversarial training*, arXiv preprint arXiv:1611.09904, 2016;

Esteban, Cristobal, et. al., *Real-valued (medical) time series generation with recurrent conditional gans*, arXiv preprint arXiv:1706.02633, 2017. In addition to these two models, GANs have been used to generate anomaly score in multivariate time-series (MAD-GAN). See Li, Dan, et. al., *Anomaly detection with generative adversarial networks for multivariate time series*, arXiv preprint arXiv:1809.04758, 2018; Li, Dan, et. al., *MAD-GAN: Multivariate anomaly detection for time series data with generative adversarial networks*, In International Conference on Artificial Neural Networks. Springer, 703-716, 2019. In MAD-GAN both the discriminator and generator are LSTM networks and the net anomaly score is a convex combination of the anomaly score generated by generator and discriminator.

As the research in communication technology and sensor network advances, one has more and more access to IoT sensor data coming through various remotely located physical/industrial processes. As a result, detection of anomalies in these multivariate IoT time-series becomes a important but challenging task. Thus, it warrant a continuous improvement of the anomaly detection ability of existing MAD-GAN architecture.

SUMMARY OF THE INVENTION

In view of the foregoing, the present invention provides a unsupervised GANs based system and method for anomaly detection in complex IoT sensor networks. The present invention exploits the residuals between real-time testing samples and reconstructed samples by generator (G) based on the mapping from GAN latent space to real-time space. The present invention uses the discriminator (D) to classify the data instances and uses Youden's statistics to set the threshold on these scores. The object of the present invention is to to improve the anomaly detection ability of existing MAD-GAN architecture.

One exemplary embodiment of the invention herein provides a deep unsupervised anomaly detection system (Deep-UAD) for multivariate time series in IoT sensor networks using an ensemble of K GANs (for example, K=5). The proprietary Deep-UAD system distinguishes anomalous situations from normal data instances for different real-life scenarios.

One exemplary embodiment of the invention provides a computer-implemented unsupervised anomaly detection (UAD) system, comprising:
a sever configured to receive real-time data from a plurality Internet of Things (IoT) sensors or manufacturing execution systems and convert real-time data to a data stream;
a processor configured to receive the data stream from the server and process the data stream using a UAD artificial intelligent (AI) core to generate an anomaly score, wherein the UAD AI core comprises an ensemble of a plurality of generative adversarial network (GAN) architectures; and a web dashboard configured to present all telemetry real-time data to a user and deliver the anomaly score alerting about any potential operational anomaly in the IoT sensor networks or manufacturing execution system.

Another exemplary embodiment of the invention provides a UAD AI core comprising long-short term memory (LSTM)-LSTM GAN, gated recurrent unit (GRU)-LSTM GAN, GRU-GRU GAN, LSTM-Multi-layer perceptron (MLP) GAN, and GRU-MLP GAN.

Another exemplary embodiment of the invention herein provides a method of deciding the threshold on anomaly scores from generator and discriminator networks using Youden's statistics to improve the classification performance by simultaneously increasing the true positive rate and minimizing false-positive rate. It has been demonstrated that least-square GAN (LSGAN) outperforms the anomaly detection algorithms present in the current literature for many classification KPIs, such as the usual binary cross-entropy GAN.

One exemplary embodiment of the invention provides a computer-implemented method for unsupervised anomaly detection (UAD), comprising:
receiving, via a sever, real-time data from a plurality Internet of Things (IoT) sensors or manufacturing execution systems;
converting, via the sever, real-time data to a data stream;
receiving, via a processor, the data stream from the server;
processing, via the processor, the data stream using a UAD artificial intelligent (AI) core to generate an anomaly score, wherein the UAD AI core comprises an ensemble of a plurality of generative adversarial network (GAN) architectures; and
presenting, via a web dashboard, all telemetry real-time data to a user; and
delivering, via the web dashboard, the anomaly score alerting about any potential operational anomaly in the IoT sensor networks or manufacturing execution system to the user.

Advantageous Effects of the Invention

The present invention provides a Deep-UAD architecture which is an ensemble of five different GANs namely, LSTM-LSTM, GRU-LSTM, GRU-GRU LSTM-MLP, GRU-MLP GANs. It has been demonstrated through rigorous experimentations that, the GAN architectures wherein the discriminator network is an LSTM/GRU network, the performance is far better compared to the case when the discriminator network is an MLP. Although MLP based generator, when used in conjunction with LSTM/GRU based discriminator, performs far better. The threshold on the combined score is set using Youden's statistics to improve the true positive rate of the model without increasing the number of false alarms drastically. The proprietary Deep-UAD model gives good performance across metrics and this is achieved with a very good AUC score indicating the good class separation capabilities of the proposed model.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

Figure 1:
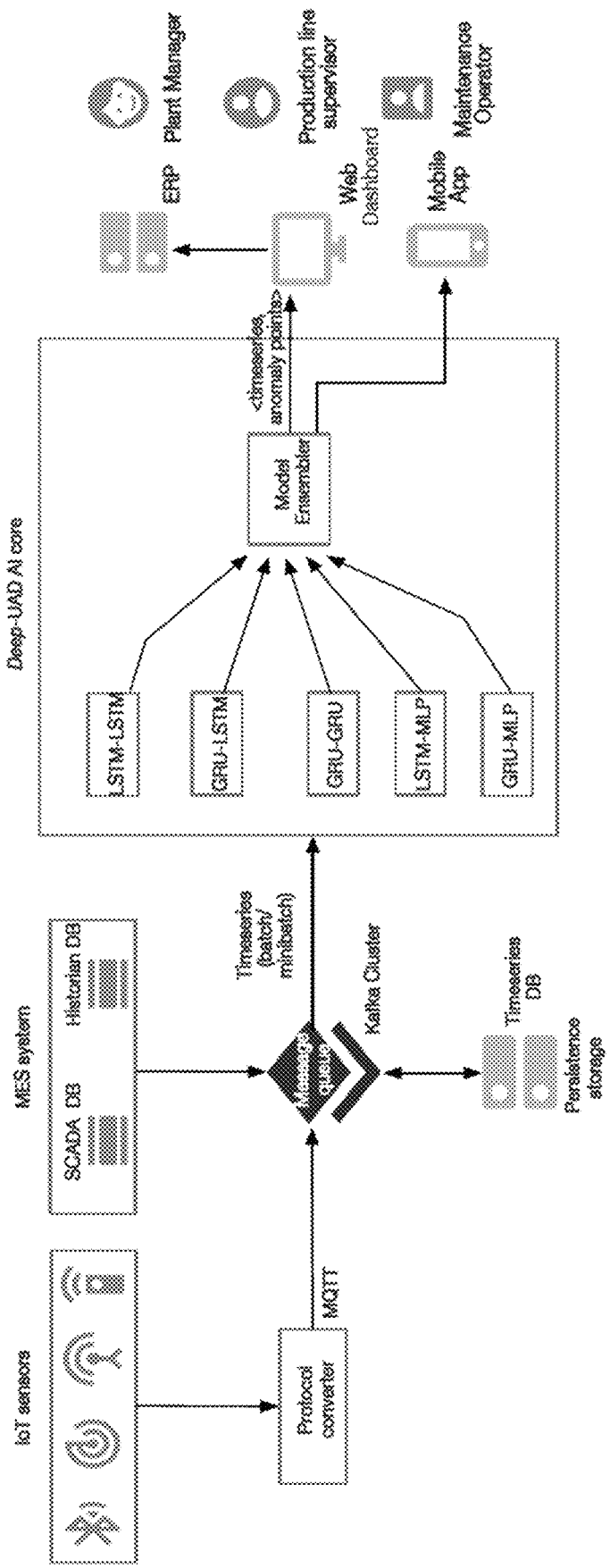
FIG. 1 depicts a general schematic of the Deep-UAD system architecture.

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Anomaly" refers to data points which do not conform to an expected pattern of the other items in the data set.

"Outliers" refer to a rare chance of occurrence within a given data set. In Data Science, an Outlier is an observation point which is distant from other observations. An Outlier may be due to variability in the measurement or it may indicate experimental error.

"Deep learning" refers to a subfield of machine learning concerned with algorithms inspired by the structure and function of the brain called artificial neural networks.

"Natural language generation (NLG)" refers to the use of artificial intelligence (AI) programming to produce written or spoken narrative from a dataset.

"Unsupervised machine learning (ML)" refers to unsupervised machine learning algorithms that gather patterns from a dataset without reference to known, or labelled outcomes.

"Kafka" is a message queue reimaged as a distributed commit log. Messages are not deleted when consumed but are all kept on the broker (like a log file keeps line items one after another).

"Mode" refers to a statistical term that refers to the most frequently occurring number found in a set of number.

"Max voting" refers to an ensemble method used for classification problems. In this technique, multiple models are used to make predictions for each data point. The predictions by each model are considered as a 'vote'. The predictions from the majority of the models are used as the final prediction.

"Stacking" is an ensemble learning technique that uses predictions from multiple models to build a new model. This model is used for making predictions on the test set.

"Blending" follows the same approach as stacking but uses only a holdout (validation) set from the train set to make predictions. In other words, unlike stacking, the predictions are made on the holdout set only. The holdout set and the predictions are used to build a model which is run on the test set.

"Bagging" is combining the results of multiple models to get a generalized result.

"Boosting" is an iterative technique which adjusts the weight of an observation based on the last classification. If an observation was classified incorrectly, it tries to increase the weight of this observation and vice versa.

"Data stream" refers to a sequence of digitally encoded coherent signals used to transmit or receive information that is in the process of being transmitted. A data stream is a set of extracted information from a data provider.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

FIG. 1 illustrates the system architecture of the proprietary Deep-UAD system. This architecture mainly consists of three parts. The first part consists of data/time-series preparation wherein, data from different IoT sensors and manufacturing execution systems such as supervisory control and data acquisition (SCADA) and programmable logic controllers (PLCs) are stored in a staging server, for example Kafka cluster, as time-series batch/mini-batch for the further processing. As data coming from the IoT sensors might have different protocols, a protocol converter, such as machine-to-machine (M2M) or Internet of Things connectivity protocol (MQTT 2), is used to convert data to a uniform format. The second part of the system comprises a Deep-UAD AI core which pulls data from the Kafka server for further processing using AI core. AI core consists of an ensemble of five GAN architectures, namely, LSTM-LSTM, GRU-LSTM, GRU-GRU, LSTM-MLP, GRU-MLP GANs. Each of these models calculates its anomaly score. An input data stream is classified as an anomalous instance if the majority of the models (at least 3 out of 5 models) flag that as an outlier. This task is performed by a model ensembler. The model ensembler may apply common ensemble techniques including but not limited to max voting, averaging, weighted averaging, stacking, blending, bagging, and boosting. The third part of system provides a web dashboard that presents all the telemetry data to users, such as plant managers, production line managers or maintenance manager. The users also receive alerts about any potential operational anomaly or attacks in the system in their mobile app or delivered to their email.

Figure 2:
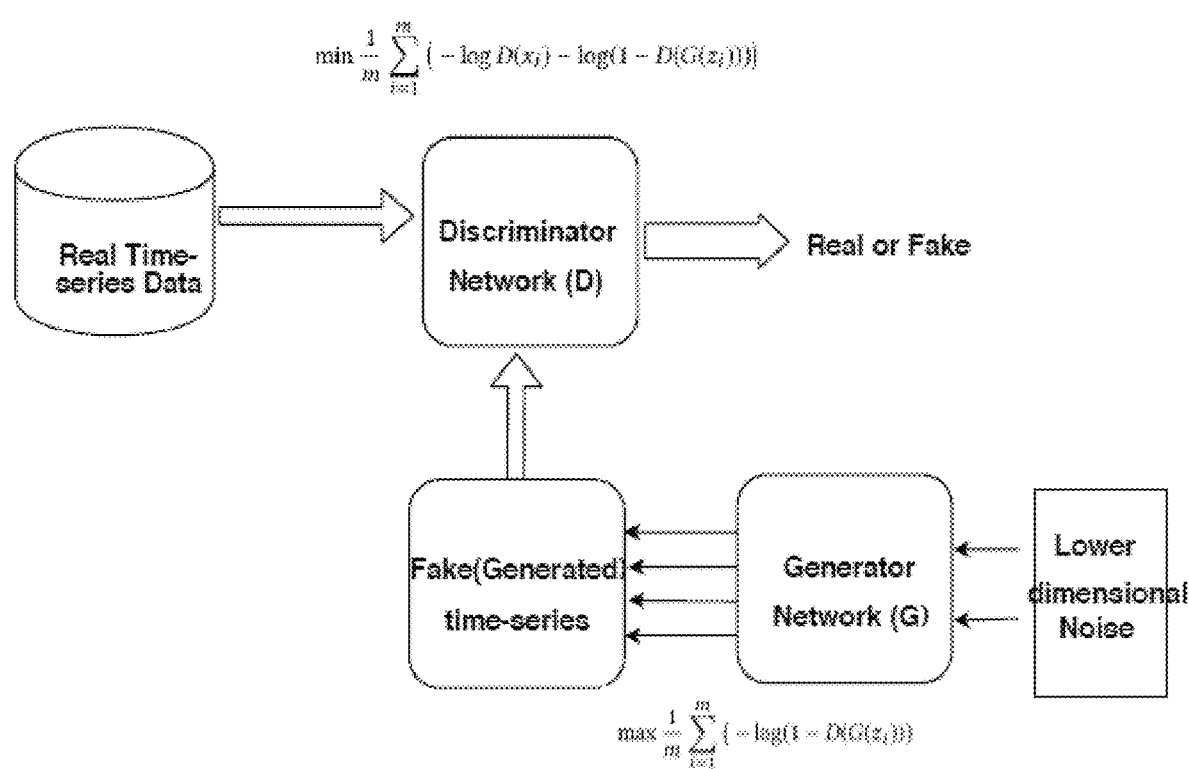
FIG. 2 details a general schematic of generative adversarial network, $x_i$, $i \in \{1, 2, \ldots, m\}$ denotes the real sample and zi denotes a lower-dimensional noise sample.

FIG. 2 shows a general schematic for the GAN architecture used in the present Deep-UAD AI core. Here, $x_i \in R^{N_f}$, is the original data sample and $N_f$ is the dimensionality of the feature space and $z_i \in R^{N_l}$ the lower dimensional noise in the latent space. The convention $N_f < N_l$ is always followed. Also, i is the integer indexing variable such that, $i \in \{1, 2, 3, \ldots, m\}$.

The basic aim of an anomaly detection task is to determine whether a testing data is generated from the real-data distribution or not. The non-conforming points are called anomalies, outliers or an intrusion. The present Deep-UAD system applies LSTM, GRU, and MLP (Multi-layer perceptron) for the design of the generator and discriminator models in the GAN architecture. Also, following the naming convention, every GAN architecture is given the name of the form, X-Y GAN, where X is the type of discriminator network and Y is the type of generator network. Both X and Y can be either LSTM, GRU or an MLP. So, in total, the present system have tested 9 GAN architectures for anomaly detection.

To prepare the data in a way that is easily understandable by the discriminator and generator network in the GAN architecture, LSTM and GRU process the time-series data in the form of rolling sub-sequence to take advantage of any temporal correlation that is present in the data. MLP, on the other hand, accepts time-series data in the form of batches. The training data sequence is denoted by x, $x \in R^{M \times N_f}$ where M is the number of observations and $N_f$ is the number of streams in the multivariate sequence. $N_f$ can also be considered as the dimensionality of the feature space. Each observation is denoted by the vector $x_i$, $x_i \in R^{N_f}$. Similarly lower dimensional noise input sequence is denoted as $z=z_i$, $i \in \{1, 2, \ldots, m\}$, where, $z_i \in R^{N_l}$, $N_l$ is the dimensionality of the latent space. By feeding X and Z to the GAN model, the generator and discriminator are trained with the following two-player minimax game:

$$\min_D \max_G V(D, G) = E_{x \sim p_{data}(X)}[\log D(x)] + E_{x \sim p_Z(Z)}[\log(1 - D(G(z)))]$$

In a standard GAN framework, the parameters of D and G are updated based on the outputs of D, so that the discriminator can be trained to be as sensitive as possible to assign correct labels to both real and fake sequences, while the generator will be trained to be as smart as possible to fool the discriminator (i.e. to mislead D to assign real labels to fake sequences) after sufficient rounds of iterations. By being able to generate realistic samples, the generator G will have captured the hidden multivariate distributions of the training sequences and can be viewed as an implicit model of the system at normal status. At the same time, the resulting discriminator D has also been trained to be able to distinguish fake (i.e. abnormal) data from real (i.e. normal) data with high sensitivity. A detailed training procedure is shown as follows, for $k^{th}$-epoch do
Generate noise sample in latent space. $Z=\{z_i, i=1, \ldots, m\}$
Conduct discrimination process, $$X=\{x_i, i=1, \ldots, m\} \Rightarrow D(X) \approx 0$$

$$G(Z) \Rightarrow D(G(Z)) \approx 1$$

Update discriminator parameter by minimizing $D_{loss}$ $$\min \frac{1}{m} \sum_{i=1}^{m} (-\log D(x_i) - \log(1 - D(G(z_i))))$$

Update generator parameter by minimizing $G_{loss}$ $$\min \frac{1}{m} \sum_{i=1}^{m} (-\log(D(G(z_i))))$$

or $$\max \frac{1}{m} \sum_{i=1}^{m} (-\log(1 - D(G(z_i))))$$

end

Once the training is completed, one can use both generator and discriminator to generate an anomaly score for all the test-data instances. A detailed process of obtaining anomaly scores from a discriminator and generator network is described below along with the novel way of combining these two scores to generate net anomaly scores using Youden's statistics to achieve better anomaly detection performance.

Discriminator Score (Ds)
After the training is completed, the discriminator learns the following mapping from feature space to a binary tuple $$D: R^{Nf} \rightarrow \{0,1\}$$

Here, 0 is the label for real data and 1 is the label for fake data (or the data generated by generator network, G). Therefore, if a test data instance $x_i$ is given as an input to the trained discriminator network, the discriminator output $D(x_i)$ represents the probability $P(x_i=1|data)$. Therefore, a user can set the threshold on class probabilities $D(x_i)$ to decide the degree of abnormality of a data instance.

Generator Score (Gs)
A trained discriminator learns the following map from latent space to feature space, $$G: R^{Nl} \rightarrow R^{Nf}$$

Thus, a generator network will produce sequences that look very close to the real data. for each instance of the test data $x_i$, one sample n random samples from a lower-dimensional latent space. The output of the generator network for these n random samples is a point in feature space. These outputs are denoted by $G(z)=\{G(z_1), \ldots, G(z_n)\}$. Out of these n outputs, the one which is closest to the $x_i$, in the sense of $L^2$ norm is called $G(z^*)$. Then, the reconstruction error given by, $\|x_i - G(z^*)\|_2^2$ is calculated. The amount of reconstruction error incurred for each data instance $x_i$, represents the degree of normality of the test-data instance. this reconstruction error is denoted as Gs.

Combined Score
Since both the Discriminator Score and the Generator Score are a valid parameter in themselves to detect anomalous instances, a combined score can be generated based by taking a convex combination of both these scores.

$$S = \alpha \times D_s + (1-\alpha) \times G_s$$

Youden's J statistic (or Youden's index) is a characteristic parameter used to summarize the performance of a classifier. See Youden, William J, Index for rating diagnostic tests, Cancer 3, 1, 32-35, 1950. The value of this index is defined for all points in the receiver operating characteristic (ROC) curve as $$J = \text{sensitivity} + \text{specificity} - 1$$

A Youden's index value of 1 indicates that the classifier is perfect with no false positives or false negatives. A value of 0 indicates that the classifier is of no use.

To define the cut-off values for all the 3 scores (Ds, Gs and S), Youden's index was calculated for all the points in the respective ROC curves. The threshold was selected to be the value corresponding to which Youden's index was the highest.

Figure 3:
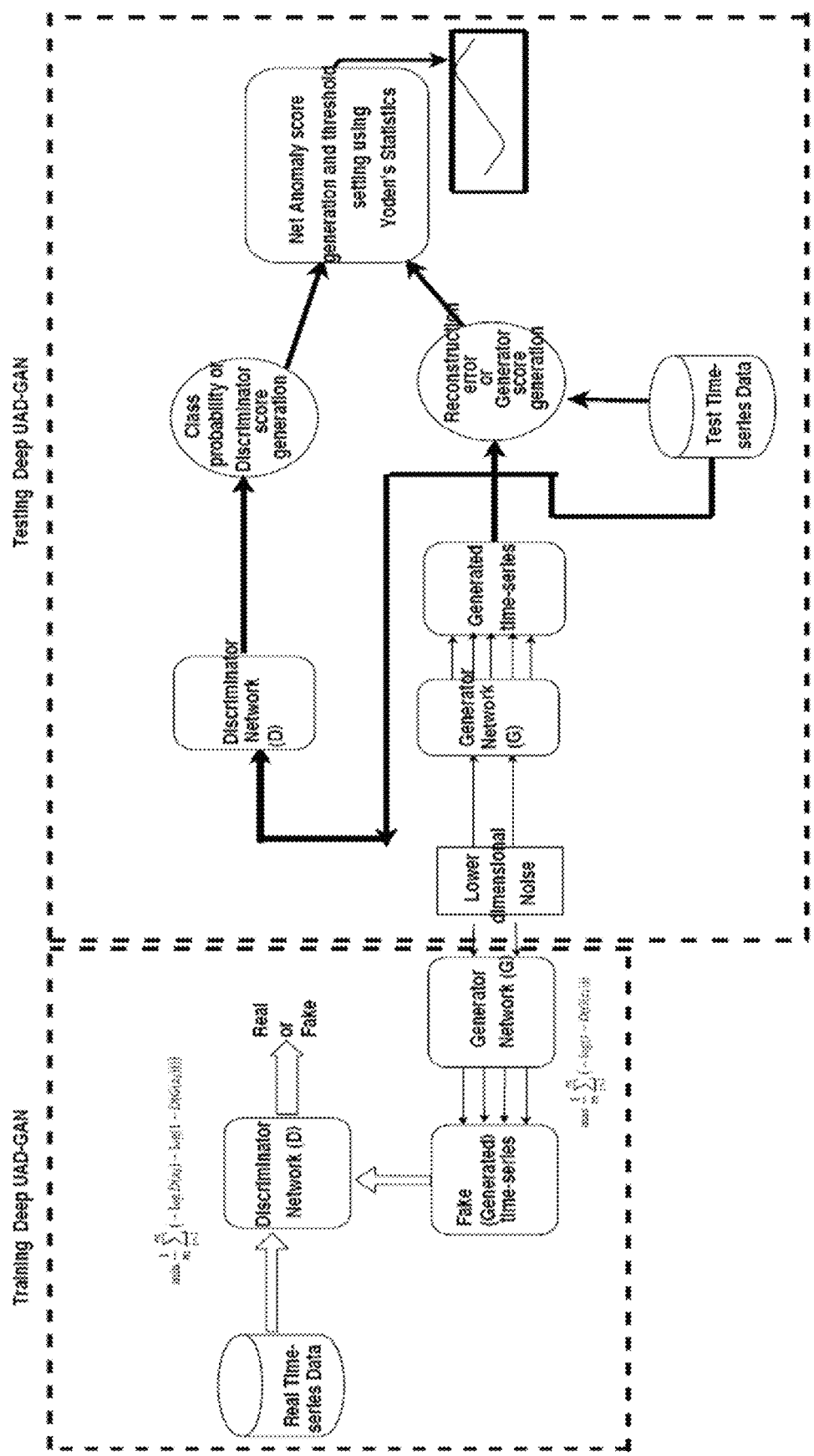
FIG. 3 depicts a schematic of the Deep-UAD GAN architecture.

The testing procedure and anomaly score generation for anomaly detection in multivariate time-series data are illustrated as follows, Generator score=[ ]
Discriminator score=[ ]
Combined score=[ ]
for $k^{th}$ test data $x_k^{test}$ do
  Sample N=(=50 in our case) samples from the latent space. $Z_{test}=\{z_i, i=1, \ldots, N\}$. Use generator to generate data in the original data spate $G(z)=\{G(z_1), \ldots, G(z_N)\}$
  Choose the generated sample, $G(z_j)$, which is closest to the test data in the sense of $\mathcal{L}_2$ norm. Call it $G(z^*)$
  Calculate the reconstruction error $\|x_k^{test} - G(z^*)\|_2^2$
  $G_s$=Generator score$\leftarrow$(=[Generator score, $(\|x_k^{test} - G(z^*)\|_2^2)$]
  $D_s$=Discriminator score$\leftarrow$[Discriminator score, $(D(x_k^{test}))$]
  Combined score$\leftarrow$[Combined Score, $(\lambda D_s + (1-\lambda)G_s]$, here, $0 \leq \lambda \leq 1$ and $\lambda \in \mathbb{R}$
end The present Deep-UAD system comprises an ensemble of 5 GAN architectures that give the best performance on test-set. The test data instance is labeled as an anomaly by 3 or more GANs in the ensemble. The overall architecture of the Deep-UAD system is depicted in FIG. 3.

In the case where the discriminator and/or generator networks are LSTM or GRU, the whole multivariate sequence is passed as a rolling window. This was done so that LSTM and GRU can take advantage of any temporal correlations that exist in the data set. The length of the rolling window greatly affects the performance of the Deep-UAD-GAN. The best performance KPIs were achieved when the size of this rolling window was kept equal to one. Apart from the usual GAN architecture, which uses binary cross-entropy loss function, least-square GAN (LSGAN) architecture is also tested in the present system. In LSGAN, the parameters of discriminator are updated by minimizing, $$\min \frac{1}{2m} \sum_{i=1}^{m} [(D(x_i) - b)^2 + (D(G(z_i)) - a)^2]$$

and the parameters of the generator network are updated by minimizing, $$\min \frac{1}{2m} \sum_{i=1}^{m} [(D(G(z_i)) - c)^2]$$

Here, a and b are the labels of the real and fake data respectively and c is the label the generator network wants the discriminator network to believe. In the present system b=c=0, &, a=1.

In the present Deep-UAD system, an LSTM/GRU network with depth 3 and 100 hidden (internal) units for the generator. The LSTM/GRU network used for the discriminator is relatively simpler with 100 hidden units and depth 1. In the case of MLPs, the generator has 3 hidden layers with 100 neurons each. While the discriminator has 4 hidden layers with 100-100-50-25 neurons in each layer. The dimensionality of the PCA process is decided by the amount of variance of the total data that is captured by the principle components. The dimensionality of latent-space in the case of PCA was fixed to be 2.

The performance of the present Deep-UAD system is evaluated on the basis of standard classification metrics like, accuracy, precision, recall and F1-score as follows, $$accuracy = \frac{TP + TN}{TP + TN + FP + FN}$$

$$precision = \frac{TP}{TP + FP}$$

$$recall = \frac{TP}{TP + FN}$$

$$F1 - Score = 2 \times \frac{precision \times recall}{precision + recall}$$

Here, TP is the correctly detected anomaly (True Positives), FP is the falsely detected anomaly (False Positives), TN is the correctly assigned normal (True Negatives), and FN is the falsely assigned normal (False Negatives). AUC-score for different models is also calculated, which indicates class separation capability of models. Since the problem at hand is detecting anomalies in the data, so the main aim of the system is to detect all the anomalies even if the algorithm raises few false alarms, as long as they are not very high. So, precision, recall and F1-score are important metrics for this particular application compared to accuracy.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

EXAMPLES

Example 1. Usage of the Deep-UAD System in a Network of a Singapore Based Water Utility Company The data set from a Singapore based water utility company (SWaT) contains the data collected from the test-bed with 11 days of continuous operation. This data set consisted of 7 days data was collected under normal operation, along with 4 days of data with attack scenarios. Details of the SWaT data set is shown in Table 1. More detail on the SWaT data-set can be found at, https://itrust.sutd.edu.sg/testbeds/secure-water-treatment-swat/.

TABLE 1

| general information about the SWaT data set | | |
|---|---|---|
| S. Number | Items | SWaT |
| 1 | Variables | 51 |
| 2 | Attacks | 36 |
| 3 | Attack Duration (Mins.) | 2-2.5 |
| 4 | Training (Normal) data size | 496800 |
| 5 | Test-data size (data with attack) | 449914 |
| 6 | Amount of normal data (in %) | 88.02 |

Tables 2a and 2b represent the results for applying different GAN architectures with binary cross-entropy loss and least square respectively to the SWaT data set to detect anomalies. In tables 2a and 2b, the names of the model are in the form X-Y, where, X is the architecture of discriminator and Y is the architecture of the generator model. The architecture of Deep-UAD-GAN consists of an ensemble of five LSGAN architectures namely, LSTM-LSTM, GRU-LSTM, GRU-GRU LSTM-MLP, GRU-MLP GANs. Also, D, G and D+G represents the anomaly scores by discriminator, generator and combination of both respectively. The prior art results using the MAD-GAN-AD architecture on the same data sets are 94.8 for accuracy, 93.33 for precision, 63.64 for recall and 0.75 for F1-Score. See Li, Dan, et. Al., *Anomaly detection with generative adversarial networks for multivariate time series*, arXiv preprint arXiv:1809.04758, 2018; Li, Dan, et. al., *MAD-GAN: Multivariate anomaly detection for time series data with generative adversarial networks*, In International Conference on Artificial Neural Networks, Springer, 703-716, 2019. Li has tried to improve upon one performance metric at a time while not caring about other performance metrics thereby, degrading other performance metrics.

TABLE 2a

Binary cross-entropy GAN

| Model | AD-Score | Accuracy | Precision | Recall | F1-Score | AUC-Score |
|---|---|---|---|---|---|---|
| LSTM-LSTM | D | 94.97 | 99.78 | 58.67 | 0.74 | 0.79 |
| | G | 94.49 | 87.26 | 63.89 | 0.74 | 0.81 |
| | D + G | 94.49 | 87.26 | 63.89 | 0.74 | 0.81 |
| GRU-LSTM | D | 58.04 | 19.95 | 81.62 | 0.32 | 0.68 |
| | G | 93.96 | 82.16 | 64.11 | 0.72 | 0.81 |
| | D + G | 94.04 | 83.15 | 63.81 | 0.72 | 0.81 |
| LSTM-GRU | D | 15.23 | 12.35 | 98.19 | 0.22 | 0.51 |
| | G | 91.67 | 66.46 | 63.03 | 0.65 | 0.79 |
| | D + G | 91.69 | 66.66 | 63.01 | 0.65 | 0.79 |
| GRU-GRU | D | 95.02 | 97.29 | 60.62 | 0.75 | 0.8 |
| | G | 92.55 | 71.86 | 63.45 | 0.67 | 0.8 |
| | D + G | 92.97 | 74.79 | 63.48 | 0.69 | 0.8 |
| MLP-MLP | D | 87.87 | NAN | NAN | NAN | 0.5 |
| | G | 92.64 | 72 | 67.94 | 0.68 | 0.8 |
| | D + G | 92.72 | 72.99 | 63.43 | 0.68 | 0.8 |
| LSTM-MLP | D | 94.3 | 86.12 | 63.2 | 0.73 | 0.81 |
| | G | 94.5 | 88.77 | 63.16 | 0.74 | 0.81 |
| | D + G | 94.57 | 88.82 | 63.16 | 0.74 | 0.81 |
| MLP-LSTM | D | 87.87 | NAN | NAN | NAN | 0.5 |
| | G | 94.88 | 93.33 | 62.31 | 0.75 | 0.81 |
| | D + G | 94.12 | 84.85 | 62.61 | 0.73 | 0.81 |
| GRU-MLP | D | 84.91 | 42.57 | 69.88 | 0.53 | 0.78 |
| | G | 94.77 | 95.33 | 59.84 | 0.74 | 0.8 |
| | D + G | 94.77 | 95.27 | 59.84 | 0.74 | 0.8 |
| MLP-GRU | D | 86.11 | 44.94 | 64.38 | 0.53 | 0.77 |
| | G | 94.95 | 99.75 | 58.52 | 0.74 | 0.79 |
| | D + G | 93.14 | 77.09 | 61.78 | 0.69 | 0.8 |
| Deep-UAD-GAN | | 94.7 | 90.4 | 63.03 | 0.74 | 0.81 |

TABLE 2b

Least Square GAN

| Model | AD-Score | Accuracy | Precision | Recall | F1-Score | AUC-Score |
|---|---|---|---|---|---|---|
| LSTM-LSTM | D | 72.83 | 26.08 | 67.57 | 0.38 | 0.71 |
| | G | 95.36 | 95.47 | 64.82 | 0.77 | 0.82 |
| | D + G | 95.32 | 95.03 | 64.82 | 0.77 | 0.82 |
| GRU-LSTM | D | 12.15 | 12.13 | 100 | 0.22 | 0.5 |
| | G | 94.6 | 87.42 | 64.82 | 0.74 | 0.82 |
| | D + G | 94.55 | 86.99 | 64.8 | 0.74 | 0.82 |
| LSTM-GRU | D | 70.57 | 25.24 | 72.66 | 0.37 | 0.71 |
| | G | 95.12 | 99.27 | 60.19 | 0.75 | 0.8 |
| | D + G | 95.12 | 99.27 | 60.19 | 0.75 | 0.8 |
| GRU-GRU | D | 85.89 | 44.21 | 62.62 | 0.52 | 0.76 |
| | G | 92.98 | 74.38 | 64.22 | 0.69 | 0.81 |
| | D + G | 93.71 | 79.81 | 64.4 | 0.71 | 0.81 |
| MLP-MLP | D | 86.73 | 15.33 | 2 | 0.04 | 0.5 |
| | G | 95.1v | 98.77 | 60.37 | 0.75 | 0.8 |
| | D + G | 94.95 | 98.42 | 59.33 | 0.74 | 0.8 |
| LSTM-MLP | D | 95.11 | 99.36 | 60.11 | 0.75 | 0.8 |
| | G | 94.19 | 83.66 | 64.75 | 0.73 | 0.82 |
| | D + G | 94.12 | 83.63 | 64.75 | 0.73 | 0.82 |
| MLP-LSTM | D | 72.21 | 26.42 | 72.35 | 0.39 | 0.73 |
| | G | 94.95 | 99.5 | 58.65 | 0.74 | 0.79 |
| | D + G | 93.61 | 82.05 | 60.63 | 0.7 | 0.79 |
| GRU-MLP | D | 87.87 | NAN | NAN | NAN | 0.5 |
| | G | 94.87 | 89.22 | 65.65 | 0.76 | 0.82 |
| | D + G | 94.88 | 89.27 | 65.67 | 0.76 | 0.82 |
| MLP-  | D | 88.04 | 78.1 | 1.96 | 0.04 | 0.51 |

TABLE 2b-continued

Least Square GAN

| Model | AD-Score | Accuracy | Precision | Recall | F1-Score | AUC-Score |
|---|---|---|---|---|---|---|
| GRU |  G | 94.31 | 89.23 | 60.43 | 0.72 | 0.8 |
| | D + G | 94.47 | 92.12 | 59.53 | 0.72 | 0.79 |
| UAD-GAN Deep- | | 95.15 | 93.53 | 64.44 | 0.76 | 0.82 |

The results shown in Table 2a and 2b are obtained by keeping the sub-sequence length to LSTM/GRU networks fixed to 1. Experiments were conducted by varying length-size of the sub-sequence window passed through LSTM/GRU networks. It was observed that the best results were obtained when the size of the sub-sequence window was fixed to 1. Similarly, it was also observed that the performance of anomaly detection was greatly affected by varying the dimension of PCA and the dimension of latent space. The dimension of PCA and latent space is considered as 5 and 2 respectively for SWaT data set. Table 3 shows the performance of Deep-UAD under the benchmark settings. It can be seen that the performance of Deep-UAD degrades under the setting reported in the earlier literature. See Li, Dan, et. Al., *Anomaly detection with generative adversarial networks for multivariate time series*, arXiv preprint arXiv: 1809.04758, 2018; Li, Dan, et. al., *MAD-GAN: Multivariate anomaly detection for time series data with generative adversarial networks*, In International Conference on Artificial Neural Networks. Springer, 703-716, 2019.

TABLE 3

Results obtained by Deep-UAD for the benchmark settings

| Data Set | AD-Score | Accuracy | Precision | Recall | F1-Score | AUC-Score | PCA |
|---|---|---|---|---|---|---|---|
| SWaT | 94.86 | 99.19 | 58.15 | 0.73 | 0.79 | 94.86 | 5 |

The performance of Deep-UAD-GAN is tested with binary cross-entropy loss and with least squares loss. It was observed that the least-squares version of the Deep-UAD-GAN out performs the current benchmark across all the performance metrics. It can also be seen consistently across all the architectures that, all the architectures having MLP based discriminator network performs badly, which is expected because data fed to the MLP are in the form, $R^{N_b \times N_f}$, where $N_b$ is the batch size and $N_f$ is the dimension of the feature space. Whereas input to a GRU/LSTM later is of the form, $R^{N_b \times l_s \times N_f}$, where, $l_s$ is the rolling sub-sequence window. This sub-sequence is composed of past $l_s$ samples which affects the value of the sample at the current time. Thus, LSTM/GRU layers take full advantage of temporal correlation in the data. The AUC-score of Deep-UAD-GAN model is 0.82, indicating that the model has a good class separation capacity.

Example 2. Usage of the Deep-UAD System in a Water Distribution (WADI) Data Set

Similar to the SWaT data set, the data collected from the water distribution test-bed with 16 days of continuous operation, out of which data of 14 days was collected under normal operation and data for 2 days was collected with attack scenarios. Details of the WADI data set is shown in Table 4. More details on the WADI data-set can be found on https://itrust.sutd.edu.sg/testbeds/water-distribution-wadi/

TABLE 4

| | general information about the WADI data set | |
|---|---|---|
| S. Number | Items | WDAI |
| 1 | Variables | 103 |
| 2 | Attacks | 15 |
| 3 | Attack Duration (Mins.) | 1.5-30 |
| 4 | Training (Normal) data size | 1048751 |
| 5 | Test-data size (data with attack) | 172801 |
| 6 | Amount of normal data (in %) | 94.01 |

Tables 5a and 5b show the detailed results for the WADI data set. This data set has very few instances of actual attack scenarios. The Deep-UAD-GAN shows the recall of 70.55% when models are trained using least-squares cost function. Accuracy improves when the models are trained with binary cross-entropy loss. It has been shown that one can try and choose the hyperparameters to achieve a good performance with respect to one metric but effects the performance with respect to other parameters. See Li, Dan, et. al., *MAD-GAN: Multivariate anomaly detection for time series data with generative adversarial networks*, In International Conference on Artificial Neural Networks. Springer, 703-716, 2019. Although the results for the WADI data-sets are not as promising as the results of SWaT data set, the model is able to achieve a decent recall with good AUC score indicating the good class separation capability of the model.

TABLE 5a

| | Binary cross-entropy GAN | | | | | |
|---|---|---|---|---|---|---|
| Model | AD-Score | Accuracy | Precision | Recall | F1-Score | AUC-Score |
| LSTM-LSTM | D | 83.81 | 20.59 | 61.76 | 0.31 | 0.73 |
| | G | 82.56 | 19.81 | 64.92 | 0.3 | 0.74 |
| | D + G | 82.61 | 19.94 | 65.32 | 0.31 | 0.74 |
| GRU-LSTM | D | 10.84 | 6.13 | 99.41 | 0.12 | 0.52 |
| | G | 82.64 | 19.15 | 60.97 | 0.29 | 0.72 |
| | D + G | 83 | 19.51 | 60.87 | 0.3 | 0.73 |
| LSTM-GRU | D | 38.64 | 6.14 | 66.3 | 0.11 | 0.52 |
| | G | 78.61 | 15.48 | 59.49 | 0.25 | 0.7 |
| | D + G | 77.86 | 15 | 59.58 | 0.24 | 0.69 |
| GRU-GRU | D | 94.14 | NAN | 0 | NAN | 0.5 |
| | G | 86.83 | 25.22 | 63.54 | 0.36 | 0.76 |
| | D + G | 86.64 | 24.87 | 63.44 | 0.36 | 0.76 |
| MLP-MLP | D | 8.17 | 6 | 99.41 | 0.11 | 0.51 |
| | G | 77.09 | 16.34 | 70.65 | 0.27 | 0.74 |
| | D + G | 79.8 | 15.58 | 55.43 | 0.24 | 0.68 |
| LSTM-MLP | D | 90.42 | 15.32 | 14.03 | 0.15 | 0.55 |
| | G | 80.5 | 13 | 40.91 | 0.2 | 0.62 |
| | D + G | 79.96 | 12.74 | 41.4 | 0.19 | 0.62 |
| MLP-LSTM | D | 6.13 | 5.87 | 100 | 0.11 | 0.5 |
| | G | 73.34 | 13.59 | 66.3 | 0.23 | 0.7 |
| | D + G | 69.94 | 11.36 | 60.77 | 0.19 | 0.66 |
| GRU-MLP | D | 73.87 | 12.16 | 55.63 | 0.2 | 0.65 |
| | G | 82.5 | 18.72 | 59.49 | 0.28 | 0.72 |
| | D + G | 82.24 | 18.61 | 60.28 | 0.28 | 0.72 |
| MLP-GRU | D | 6.9 | 5.9 | 100 | 0.11 | 0.51 |
| | G | 83.72 | 20.77 | 63.24 | 0.31 | 0.74 |
| | D + G | 80.16 | 17.33 | 63.34 | 0.27 | 0.72 |
| Deep-UAD-GAN | 83.68 | 20.82 | 63.74 | 0.31 | 0.74 |

TABLE 5b

| | Least-square GAN | | | | | |
|---|---|---|---|---|---|---|
| Model | AD-Score | Accuracy | Precision | Recall | F1-Score | AUC-Score |
| LSTM-LSTM | D | 79.94 | 19.17 | 75.49 | 0.31 | 0.78 |
| | G | 65.75 | 13 | 85.18 | 0.23 | 0.75 |
| | D + G | 66.48 | 13.33 | 85.87 | 0.23 | 0.76 |
| GRU-LSTM | D | 5.9 | 5.7 | 100 | 0.11 | 0.5 |
| | G | 72.89 | 13.22 | 65.22 | 0.22 | 0.69 |
| | D + G | 74.62 | 13.83 | 63.74 | 0.23 | 0.7 |
| LSTM-GRU | D | 81.7 | 18.35 | 61.56 | 0.28 | 0.72 |
| | G | 83.04 | 22.43 | 77.08 | 0.35 | 0.8 |
| | D + G | 84.7 | 24.42 | 77.08 | 0.37 | 0.81 |
| GRU-GRU | D | 81.5 | 7.08 | 17.79 | 0.1 | 0.52 |
| | G | 66.61 | 11.97 | 74.01 | 0.21 | 0.7 |
| | D + G | 66.01 | 11.86 | 74.7 | 0.2 | 0.7 |
| MLP-MLP | D | 76.47 | 7.89 | 28.26 | 0.12 | 0.54 |
| | G | 78.14 | 15.08 | 58.99 | 0.24 | 0.69 |
| | D + G | 83.76 | 17.18 | 46.44 | 0.25 | 0.66 |
| LSTM-MLP | D | 65.62 | 7.7 | 44.57 | 0.13 | 0.56 |
| | G | 80.65 | 18.18 | 65.81 | 0.28 | 0.74 |
| | D + G | 80.71 | 18.23 | 65.81 | 0.29 | 0.74 |
| MLP-LSTM | D | 7.64 | 5.92 | 99.31 | 0.11 | 0.51 |
| | G | 82.38 | 17.25 | 52.87 | 0.26 | 0.69 |
| | D + G | 83.94 | 17.44 | 46.64 | 0.25 | 0.66 |
| GRU-MLP | D | 51.59 | 8.27 | 72.04 | 0.15 | 0.61 |
| | G | 76.14 | 16.13 | 73.22 | 0.26 | 0.75 |
| | D + G | 76 | 16.08 | 73.42 | 0.26 | 0.75 |
| MLP-GRU | D | 5.98 | 5.86 | 100 | 0.11 | 0.5 |
| | G | 89.17 | 29.72 | 62.25 | 0.4 | 0.77 |
| | D + G | 89.42 | 28.57 | 53.75 | 0.37 | 0.73 |
| UAD-GAN Deep- | | 71.2 | 13.23 | 70.55 | 0.22 | 0.71 |

The results shown in Tables 5a and 5b are obtained by keeping the sub-sequence length to LSTM/GRU networks fixed to 1. Experiments were conducted by varying length-size of the sub-sequence window passed through LSTM/GRU networks. It was observed that the best results were obtained when the size of the sub-sequence window was fixed to 1. Similarly, it was also observed that the performance of anomaly detection was greatly affected by varying the dimension of PCA and the dimension of latent space. The dimension of PCA and latent space is considered as 45 and 15 respectively for WADI data set. Table 6 shows the performance of Deep-UAD under the benchmark settings. It can be seen that the performance of Deep-UAD degrades under the setting reported in the earlier literature. See Li, Dan, et. Al., *Anomaly detection with generative adversarial networks for multivariate time series*, arXiv preprint arXiv:1809.04758, 2018; Li, Dan, et. al., *MAD-GAN: Multivariate anomaly detection for time series data with generative adversarial networks*, In International Conference on Artificial Neural Networks. Springer, 703-716, 2019.

TABLE 6

| | Results obtained by Deep-UAD for the benchmark settings | | | | | |
|---|---|---|---|---|---|---|
| Data Set | AD-Score | Accuracy | Precision | Recall | F1-Score | AUC-Score | PCA |
| WADI | 69.82 | 12.59 | 69.76 | 0.21 | 0.69 | 69.82 | 8 |

The invention claimed is:

1. A computer-implemented unsupervised anomaly detection (UAD) system, comprising:
   a sever configured to receive real-time data from a plurality Internet of Things (IoT) sensors or manufacturing execution systems and convert real-time data to a data stream;

a processor configured to receive the data stream from the server and process the data stream using a UAD artificial intelligent (AI) core to generate an anomaly score, wherein the UAD AI core comprises an ensemble of a plurality of generative adversarial network (GAN) architectures; and a web dashboard configured to present telemetry real-time data to a user and deliver the anomaly score alerting about potential operational anomaly in the IoT sensor networks or manufacturing execution system;

wherein the ensemble of a plurality of GAN architectures comprises long-short term memory (LSTM)-LSTM GAN, gated recurrent unit (GRU)-LSTM GAN, GRU-GRU GAN, LSTM-Multi-layer perceptron (MLP) GAN, and GRU-MLP GAN.

2. The system of claim 1, wherein the system sets a threshold on a combined score of a discriminator score and a generator score of each GAN using Youden's statistics.

3. The system of claim 1, wherein a length of a rolling window of a multivariate sequence for LSTM GAN or GRU GAN is equal to one.

4. The system of claim 1, wherein the UAD system is configured to deliver alerts of the potential operational anomaly to the user's mobile app or email.

5. The system of claim 1, wherein at least one of the plurality of GAN architectures comprises a long-short term memory (LSTM) GAN or gated recurrent unit (GRU) GAN.

6. A computer-implemented method for unsupervised anomaly detection (UAD), comprising:

receiving, via a sever, real-time data from a plurality Internet of Things (IoT) sensors or manufacturing execution systems;

converting, via the sever, real-time data to a data stream;

receiving, via a processor, the data stream from the server;

processing, via the processor, the data stream using a UAD artificial intelligent (AI) core to generate an anomaly score, wherein the UAD AI core comprises an ensemble of a plurality of generative adversarial network (GAN) architectures; and presenting, via a web dashboard, telemetry real-time data to a user; and delivering, via the web dashboard, the anomaly score alerting about potential operational anomaly in the IoT sensor networks or manufacturing execution system to the user;

wherein the ensemble of a plurality of GAN architectures comprises long-short term memory (LSTM)-LSTM GAN, gated recurrent unit (GRU)-LSTM GAN, GRU-GRU GAN, LSTM-Multi-layer perceptron (MLP) GAN, and GRU-MLP GAN.

7. The method of claim 6, further comprising setting a threshold on a combined score of a discriminator score and a generator score of each GAN using Youden's statistics.

8. The method of claim 6, wherein a length of a rolling window of a multivariate sequence for LSTM GAN or GRU GAN is equal to one.

9. The method of claim 6, further comprising delivering alerts of the potential operational anomaly to the user's mobile app or email.

10. The method of claim 6, wherein at least one of the plurality of GAN architectures comprises a long-short term memory (LSTM) GAN or gated recurrent unit (GRU) GAN.

\* \* \* \* \*